United States Patent [19]

Illetschko

[11] Patent Number: 4,485,403
[45] Date of Patent: Nov. 27, 1984

[54] NOISE REDUCTION SYSTEM FOR TELEVISION SIGNALS

[75] Inventor: Gerhard Illetschko, Darmstadt, Fed. Rep. of Germany

[73] Assignee: Robert Bosch GmbH, Stuttgart, Fed. Rep. of Germany

[21] Appl. No.: 377,611

[22] Filed: May 13, 1982

[30] Foreign Application Priority Data

May 30, 1981 [DE] Fed. Rep. of Germany ....... 3121597

[51] Int. Cl.$^3$ ............................................. H04N 5/21
[52] U.S. Cl. ..................................... 358/167; 358/36; 455/296
[58] Field of Search ................. 358/167, 36, 336, 340; 455/296, 63, 303, 308, 222

[56] References Cited

U.S. PATENT DOCUMENTS 4,128,848 11/1978 Nakagawa ............................ 358/167
4,242,705 12/1980 Ebihara ................................. 358/36
4,249,209  2/1981 Storey ................................... 358/167
4,296,436 10/1981 Achiha ................................. 358/167
4,352,126  9/1982 Poncin ................................. 358/167

FOREIGN PATENT DOCUMENTS 2033190  5/1980 United Kingdom ................ 358/167

*Primary Examiner*—Tommy P. Chin
*Attorney, Agent, or Firm*—Frishauf, Holtz, Goodman & Woodward

[57] ABSTRACT

In a system for noise reduction in a television signal utilizing a full frame picture store to enable averaging of corresponding signals of successful frames for noise reduction and having also a motion detector, the signal representing motion is passed through a combination of a low-pass filter and a threshold circuit of which, respectively, the cut-off frequency and the threshold value are controllable as a function of the noise amplitude. As a result, at low noise content of the input signal, no disturbing loss of sharpness of moving edges occurs, whereas at higher noise amplitudes, although noise reduction is at the cost of some loss of edge sharpness, the annoying effects of having noise reduction controlled by the noise itself, are avoided.

20 Claims, 3 Drawing Figures

NOISE REDUCTION SYSTEM FOR TELEVISION SIGNALS

This invention concerns reducing noise that disturbs a television signal so that the signal may produce pictures that are not annoyingly disturbed by "snow" or other noise effects.

Systems for noise reduction in television signals are known in which the television signal is delayed by a full picture interval and then, after being weighted with a correction factor, are added to the undelayed signals. The operation of this known system depends on the fact that differences from one full television picture to the next are averaged out. This averaging produces not only the desired noise reduction, however, but also makes movement fuzzy, by reducing the sharpness of moving edges. It is therefore necessary to reduce the effect of averaging of successive pictures when there is movement in the pictures. Means are also provided to make it possible to distinguish between differences in picture values resulting from noise and those resulting from movement.

In this connection it is known from U.S. Pat. No. 4,058,836, to provide on a current basis the difference between the undelayed and the delayed television signal and to furnish the result to a threshold circuit. This type of processing goes on the basis that noise in a television signal is of relatively small amplitude, whereas in the case of movement, greater local changes in luminance are produced, which will pass through the threshold circuit and cause the noise reduction effect to operate only weakly.

These systems have the disadvantage that movement in low contrast scenes is not taken account of and are thus subjected, like noise, to contrast reduction. In consequence, moving edges lose sharpness and appear fuzzy or out of focus.

In another known system disclosed in DE-OS 29 37 284, processing is based on the fact that small picture details cannot be distinguished well by the eye during movement. A low-pass filter for the movement signal in the horizontal direction and/or the vertical direction suppresses the corresponding noise components in the movement signal. This known system has the disadvantage that with relatively little low-pass filtering noise peaks have an effect on the amount of noise suppression, because they are "mistakenly" treated as originating from picture movement. In this case, the noise reduction is controlled by the noise itself and produces a coarse-grained picture structure disturbance that occasionally distorts the picture more than the original noise. With heavy low-pass filtering, however, detail aspects of movement are suppressed, and a loss of sharpness in the portions of a picture that moves becomes quite visible.

THE INVENTION

It is an object of the present invention to provide noise reduction on the basis of comparison of successive television pictures in a manner that produces negligible impairment on the sharpness of moving portions of a picture.

Briefly, a circuit that continuously determines a variable noise reduction correction factor is controlled by a circuit of variable transmission characteristics equipped with manual or automatic control of the transmission characteristic. The circuit with controllable transmission characteristics is supplied with a signal from a stage that forms the difference, and in fact the absolute value of the difference, between the delayed and undelayed circuit.

The method and apparatus of the system has the advantage of providing an optimum fit of the noise reduction effect to the signal-to-noise ratio in the input signal. This provides complete picture sharpness without disturbing effects in the case of average noise content of the input signal. Only in the case of a high content must a loss of detail resolution in picture portions that move be taken as the price of noise reduction. Strong disturbing effects resulting from control of noise reduction by the noise itself are avoided.

BRIEF DESCRIPTION OF THE DRAWINGS

The invention is further described by way of illustrative examples with reference to the annexed drawings, in which.

BRIEF DESCRIPTION OF THE ILLUSTRATED EMBODIMENTS

Figure 1:
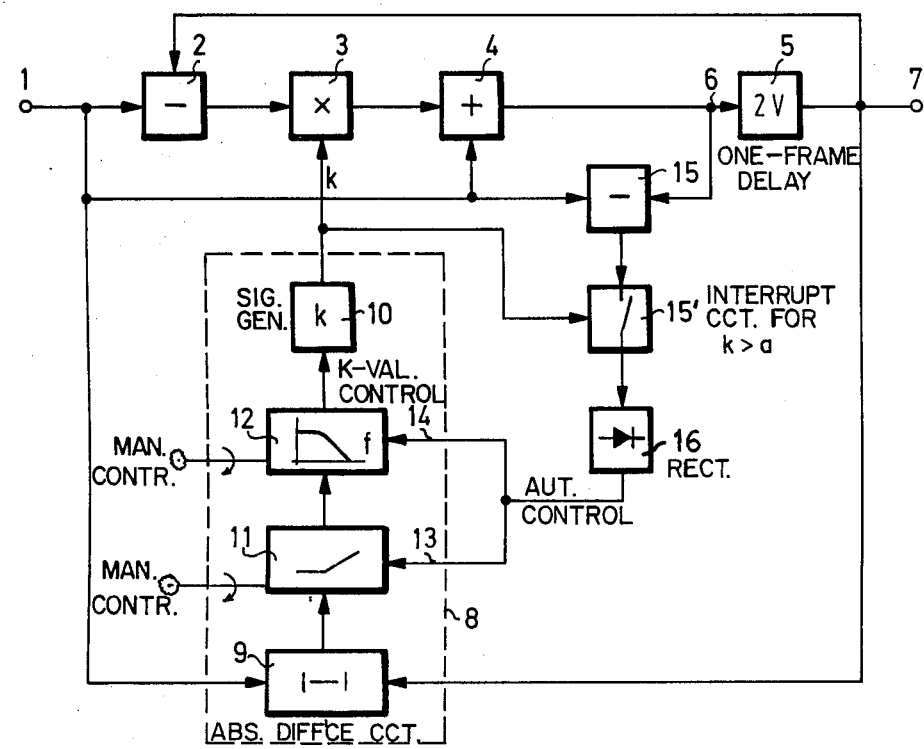
FIG. 1 is a circuit block diagram of a first embodiment of a system according to the invention.

At the terminal 1, at the upper left of FIG. 1, the television signal is introduced which is to have its noise content reduced. It proceeds directly to the addition circuit 4, where after addition to a quantity to be described presently, a sum output is passed on to a delay unit 5 which delays the television picture by the interval corresponding to a full picture. The symbol "2V" is applied in FIG. 1 to the delay unit 5 to indicate that this interval is twice the period of the vertical deflection signal of the television receiver in the usual 2-field interlaced presentation. Delay units, such as the unit 5, are sufficiently well known that they need not be described further here, except to say that they are advantageously provided by the use of a digital full-picture storage unit with suitably timed write-in and read-out functions.

The delayed signal provided at the output of the delay unit 5 is supplied to a subtraction circuit 2 by means of which the undelayed signal is subtracted from the delayed signal. The output of the subtraction circuit 2 is then processed by a multiplication circuit 3 and thereafter, as so processed, furnished to a second input of the addition circuit 4. Thus, the system composed of the circuits 2,3,4 and 5 operate as a so-called recursive filter, which averages and thereby reduces the signal amplitudes which do not repetitively return from full-picture to full-picture.

The factor k supplied to the multiplication circuit 3 determines the degree of the averaging which reduces the signals corresponding to features of the picture that do not reappear in successive frames. The more the factor k approaches the value 1, the stronger is the effect of the filter and hence the greater is the time over which the averaging (integration) is performed. The television signal with reduced noise can be taken from the circuit point 6 or the circuit point 7. For motionless pictures, a practically unlimited noise reduction is possible when a sufficiently long integration takes place.

With pictures that move, however, the integration does impair the sharpness of edges, so that it is to be reduced in effect whenever motion takes place in the picture. For this purpose, a so-called motion detector 8 is provided. This consists essentially of an absolute difference formation circuit 9, by means of which the difference between the undelayed and the delayed signal is continuously found. Since the noise-reducing effect should be independent of the sign of changes of picture content, the absolute value of the difference is formed in the circuit 9. According to the magnitude of the changes, a correction factor k for the degree of noise reduction is produced in the circuit 10. Since, in addition to movement, noise also produces an output signal in the circuit 9, which however should not be used for control of the integration process, there are interposed between these circuits 9 and 10 both a threshold circuit 11 and a low-pass filter 12. As described in the introduction, the threshold circuit 11 and the low-pass filter 12 are controlled by a control voltage applied at 13 and 14 for changing the transmission characteristic.

This control voltage corresponds to the average amplitude of the noise contained in the input signal. In order to measure the latter, a subtraction circuit 15 is provided by which the signal freed from noise is subtracted from the input signal. The difference of the two signals then provides an indication of the noise voltage present in the input signal whenever there is no movement or only negligible movement in the picture. In accordance with this significance, the difference signal is put through a gate circuit 15', which is controlled by the signal k in such a manner, that the difference signal is provided to a rectifier circuit 16 only if the value K exceeds a certain predetermined value. The latter is the case if no movement or only slight movement is occurring in the television picture.

The difference signal that is allowed to proceed out of the gate circuit 15' is then used for the derivation of a control voltage by means of a rectifying and integrating circuit 16, in order to provide this derived voltage as the respective control voltages 13 and 14 of the circuits 11 and 12. The integration time constant of the circuit 16 is so chosen that the control voltage will hold its value for such a time, as on occasion motion takes place in the picture, that in a following movement-free period that may occur, a correction can still be produced. The time constant of the circuit 16 can be chosen quite large, since a change of the signal-to-noise margin of the input signal is rarely to be expected, for example only in the case of switchover between different picture sources, as for example television cameras and film scanners. If now television signals with a stronger noise content are supplied to the system of FIG. 1, the limit frequency of the low-pass filter can be lower, and the threshold of the circuit 10 raised. In this case the desired improvement of the margin of signal over noise is still obtained, but when there is movement this is at the cost of a certain loss of sharpness at the edges.

The factor k determines—as already mentioned above—the degree of the integration of the recursive filter and thereby the degree of noise reduction, which follows the formula $$10 \log \left( \frac{1+k}{1-k} \right).$$

Thus for $k=0.6$ a noise reduction of 6 dB results. The noise amplitude in the input signal is then twice as great as the amplitude of the noise content of the output signal. When movement is present in the picture, the factor k is made smaller by means of the movement detector 8, but when there is no movement this factor k becomes approximately equal to the value corresponding to the degree of desired noise reduction. This can, for example, be $k=0.6$, if the apparatus is set for a 6 dB noise reduction.

Since commonly the noise content in television signals does not change often, it is practical, within the scope of the present invention, to provide also a manual setting of the threshold value and also of the filter cut-off frequency, for which manual controls (not shown in the drawing) are then provided. It is likewise possible for particular applications to provide to advantage for individual adjustments respectively of the threshold value and of the cut-off frequency.

Figure 2:
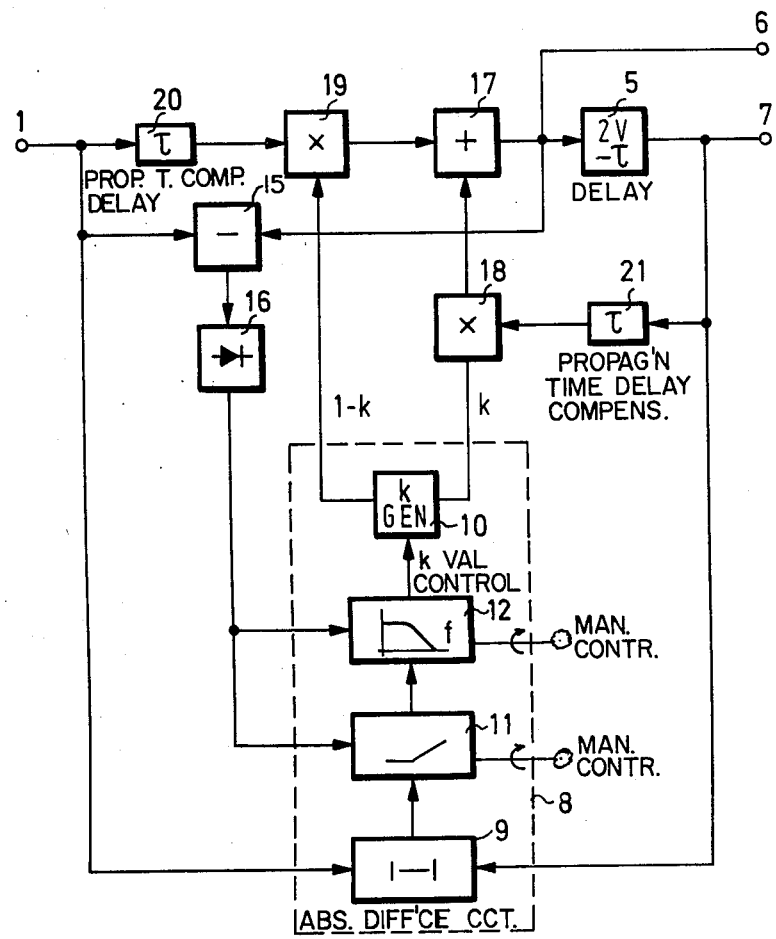
FIG. 2 is a block circuit diagram of a second embodiment of a system according to the invention.

FIG. 2 shows a further illustrative embodiment according to the invention in which simply the recursive filter has been provided in form deviating from that illustrated in FIG. 1. The same components are provided with the same reference numerals in these two figures. The difference from the system of FIG. 1 consists essentially in that the delayed television signal is multiplied in the multiplication circuit 18 by the factor k before the addition operation in the addition circuit 17, whereas the undelayed input signal is multiplied by the factor $(1-k)$ in a multiplier circuit 19 and as thus modified is supplied to the addition circuit 17. Furthermore, in the system of FIG. 2, two further delay units 20 and 21 are shown, which equalize signal propagation times which occur in different function blocks of the system of FIG. 2. Such precautions are familiar to those practiced in the art, and in this connection should be regarded merely as an indication that such details should be taken account of in providing a practical embodiment of either FIG. 1 or of FIG. 2.

Figure 3:
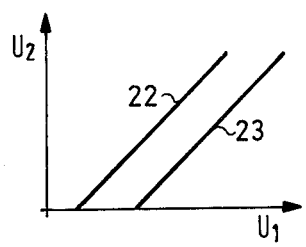
FIG. 3 is a graph showing different values of characteristic curves in the threshold circuits of FIGS. 1 and 2.

FIG. 3 shows on a graph the characteristic of the threshold circuit 11. The output signal $u_2$ is plotted as a function of the input signal $u_1$. The characteristic line 22 is provided for input signals with small noise content, and the characteristic 23 for input signals with high noise content, thus showing the effect of change of the control voltage applied through the connection 13 from the rectifying and integrating circuit 16.

Although the invention has been described with reference to particular illustrative embodiments, variations and modifications are possible within the scope of the inventive concept. Thus, for example, the sequence of the circuits 11 an 12 is not at all fixed and, instead of being as shown in FIGS. 1 and 2, can also be selected differently in providing a practical embodiment of the invention.

I claim:

1. Apparatus for reducing noise content of television signals having an input for a television signal and comprising:

means for delaying said television signal by a picture period;

means for producing a difference signal representative of the difference between the output of said signal delay means and said input television signal present at said input;

means including a controllable signal generator and a multiplier for producing a modified difference signal by multiplicatively reducing said difference signal by a correction factor k delivered as a signal by said signal generator;

means for adding together said input television signal and said modified difference signal and furnishing a resulting sum signal to said signal delay means;

means for determining the absolute difference between said input television signal and said output of said television signal delaying means, for producing a signal indicative of movement in the picture represented by said television signal;

means for applying a signal derived from said picture movement indicative signal to control said signal generator;

signal transmission means of variable transmission characteristic interposed between said means for producing said signal indicative of picture movement and said means for applying said movement indicative signal to said signal generator, for control of said correction factor, and means responsive to the noise content of said input television signal for varying said transmission characteristic of said signal transmission means with reference to the noise content of said input television signal.

2. Apparatus as defined in claim 1, in which said signal transmission means includes a low-pass filter of variable cut-off frequency.

3. Apparatus as defined in claim 1, in which said signal transmission means includes a threshold value circuit of variable threshold level.

4. Apparatus as defined in claim 2 or claim 3, in which said means for varying the transmission characteristic of said circuit of variable transmission characteristic are manually actuatable varying means.

5. Apparatus as defined in claim 2 or claim 3, in which means are provided for deriving a control voltage representing the amplitude of the noise content of said input television signal, and in which said means for varying the transmission characteristic of said signal transmission means comprises automatic means responsive to the value of said derived noise content signal.

6. Apparatus as defined in claim 1, in which said means for deriving a control voltage representative of the noise content of said input television signal comprises means for providing a signal representing the difference between said input television signal and said sum signal, and means for rectifying and averaging said signal representative of the difference between said input television signal and said sum signal to provide said control voltage.

7. Apparatus as defined in claim 6, in which means are provided for interrupting the input to said rectifying means when said correction factor (k) has a magnitude less than a predetermined magnitude.

8. Method of reducing noise content of a television signal comprising the steps of:

adding said television signal to the product of a first difference signal and a correction factor k to produce a sum signal, said first difference signal being the difference obtained by subtracting said television signal from a delayed sum signal formed by delaying the result of the adding step for one television frame period;

delaying the sum signal by one television frame to produce said delayed sum signal;

producing a signal responsive to movement in the picture represented by said television signal by forming a signal representative of the absolute difference between said television signal and said delayed sum signal;

passing said picture movement responsive signal through a control circuit of variable transmission characteristics to produce a modified picture-motion signal;

obtaining said correction factor k from a signal generator (10) which is controllable by said modified picture-motion signal to reduce the value of said correction factor k from a normal value thereof in response to said modified picture movement signal, and varying the transmission characteristic of said control circuit of variable transmission characteristics in a manner dependent on the magnitude of noise appearing in said television signal.

9. Method as defined in claim 8, in which the step of varying said control transmission characteristic of said circuit of variable transmission characteristic includes the variation of the cut-off frequency of a low-pass filter in said circuit.

10. A method as defined in claim 8, in which the step of varying said control transmission characteristic of said circuit of variable transmission characteristic includes the variation of a threshold value of a threshold value circuit included in said control circuit of variable transmission characteristic.

11. A method as defined in claim 9 or claim 10, in which said noise magnitude is visually observed on a visible display of said television signal and the step of varying said transmission characteristic is performed by means of at least one manual circuit control.

12. A method as defined in claim 9 or claim 10, including also the step of deriving from the difference between said television signal and said sum signal, a signal representative of noise amplitude and utilizing said derived noise signal for producing variation of said transmission characteristic of said control circuit of variable transmission characteristic.

13. Method of reducing noise content of a television signal comprising the steps of:

generating a correction factor signal (k) and its complement signal (1−k) by means of a signal generator which is controllable to vary said correction factor signal and, consistently therewith, also said complement signal;

multiplying an input television signal by said complement signal, passing the resulting first product signal through an addition circuit and supplying the resulting sum signal to a delaying stage that delays it for a television picture period to produce a delayed television signal;

multiplying said delayed television signal by said correction factor signal and supplying the resulting second product signal to the same addition circuit through which said first product signal is passed, so as to add said product signals to form said sum signal;

producing a signal responsive to movement in the picture represented by said input television signal by forming a difference signal representative of the absolute difference between said input television signals and said delayed television signal;

passing said picture-movement responsive signal through a control circuit of variable transmission characteristics to produce a modified picture-movement signal;

varying the transmission characteristic of said control circuit of variable transmission characteristics in a manner dependent on the magnitude of noise appearing in said input television signal, and applying said modified picture-movement signal to said controllable signal generator for controlling it so as to reduce said correction factor in response to said modified picture-motion signal.

14. Method according to claim 13 in which said input television signal is subjected to a propagation-time equalizing delay before being multiplied by said complement signal and said delayed signal is delayed by a television picture period less a propagation-time equalizing delay decrement for producing said picture-motion responsive signal.

15. Method according to claim 13 in which the step of varying said transmission characteristic of said control circuit of variable transmission characteristic includes the variation of the cut-off frequency of a low-pass filter in said circuit.

16. Method according to claim 13 in which the step of varying said transmission characteristic of said control circuit of variable transmission characteristic includes the variation of a threshold value of a threshold value circuit included in said control circuit of variable transmission characteristic.

17. Apparatus for reducing the noise content of television signals having an input (1) for a television signal and comprising:

means (5,21) for delaying television signals by a picture period having an input and at least one delayed-signal output;

means including a controllable signal generator (10) and a multiplier (19) for producing a modified input television signal by multiplicatively reducing said input television signal obtained from said input by the complement (1−k) of a correction factor (k), said complement being provided as a signal by said signal generator to said multiplier;

means (18) for producing a modified delayed television signal by multiplicatively reducing said delayed-signal output of said television signal delaying means by said correction factor (k), said factor being provided as a signal by said signal generator to said multiplier;

means (17) for adding together said modified input television signal and said modified delayed television signal and for providing the resulting sum signal of said adding means to said input of said television signal delaying means;

means for determining the absolute difference between said input television signal and said output of said television signal delaying means for producing a signal indicative of movement in the picture represented by said input television signal;

means for applying to said signal generator a control signal derived from said picture movement signal;

signal transmission means of variable transmission characteristic interposed between said means for producing said picture movement signal and said means for applying to said generator said control signal derived from said picture movement signal, for control of said correction factor, and means for varying said transmission characteristic of said signal transmission means with reference to the noise content of said input television signal.

18. Apparatus as defined in claim 17, in which said signal transmission means includes a low-pass filter of variable cut-off frequency.

19. Apparatus as defined in claim 17, in which said signal transmission means includes a threshold value circuit of variable threshold level.

20. Apparatus as defined in claim 17, in which propagation time compensating delay means (20) are interposed between said input (1) and said multiplier (19) of said means for producing a modified input television signal and said television signal delaying means (5, 21) has a first output for providing a signal delayed therein by a television picture period to said means (18) for producing a modified delayed television signal for said adding means (17) and a second output for providing to said absolute difference determining circuit a signal delayed in said television signal delaying means (5) by a period, equal to a television period less the delay period of said propagation time compensating delay means (20).

* * * * *